United States Patent
Holtkötter et al.

(10) Patent No.: US 6,667,395 B2
(45) Date of Patent: Dec. 23, 2003

(54) PROCESS AND APPARATUS FOR THE INDUSTRIAL PREPARATION OF METHYLHYDROXYALKYLCELLULOSE

(75) Inventors: Torsten Holtkötter, Walsrode (DE); Stefan Michel, Walsrode (DE); Gerd Sonnenberg, Walsrode (DE)

(73) Assignee: Wolff Cellulosics GmbH & Co. KG, Walsrode (DE)

( * ) Notice: Subject to any disclaimer, the term of this patent is extended or adjusted under 35 U.S.C. 154(b) by 0 days.

(21) Appl. No.: 10/241,711

(22) Filed: Sep. 11, 2002

(65) Prior Publication Data

US 2003/0065166 A1 Apr. 3, 2003

(30) Foreign Application Priority Data

Sep. 14, 2001 (DE) .......................................... 101 45 408
Jul. 29, 2002 (DE) .......................................... 102 34 426

(51) Int. Cl.$^7$ ............................................... C08B 11/00
(52) U.S. Cl. ........................................................ 536/56
(58) Field of Search ............................. 536/56, 84, 91, 536/95, 96, 108, 123.1, 124

(56) References Cited

U.S. PATENT DOCUMENTS

| | | | |
|---|---|---|---|
| 4,015,067 A | 3/1977 | Liu et al. ...................... | 536/96 |
| 4,117,223 A | 9/1978 | Lödige et al. ................. | 536/99 |
| 4,199,266 A | 4/1980 | Giusti ........................ | 366/296 |
| 4,310,663 A | * 1/1982 | Hilbig et al. ................. | 536/91 |
| 4,728,731 A | 3/1988 | Raehse et al. ................. | 536/96 |
| 4,984,899 A | 1/1991 | Bollenrath et al. ......... | 366/302 |
| 5,399,014 A | 3/1995 | Takata et al. ................. | 366/262 |

FOREIGN PATENT DOCUMENTS

GB 1166060 10/1969

OTHER PUBLICATIONS

Database WPI Week 197002 Derwent Publications Ltd., London, GB; AN 1970–02601r.
XP002226093, "Cellulose digester with wasching apparatus." & CA 831 753 A (AB KAMYR) Zusammenfassung.
Database WPI Week 199604 Derwent Publications Ltd., London, GB; AN 1996–038934.
XP002226094 "Process and appts. for fluidising flockedcellulosic pulp suspension mixt. with process additives—using rotor unit comprising coaxial inner and outer cylindrical cages provided with rotating bars" & SE 9 401 144 A (KVAENER PULPING AB), Okt. 7, 1995 (Oct. 7, 1995) Zusammenfassung.

* cited by examiner

Primary Examiner—Samuel Barts
Assistant Examiner—Ganapathy Krishnan
(74) Attorney, Agent, or Firm—Godfried R. Akorli; Diderico van Eyl

(57) ABSTRACT

A description is given of a process for the industrial preparation of methylhydroxyalkylcelluloses (MHACs) by reaction of cellulose with alkali metal hydroxide and subsequent reaction with an alkyl halide and hydroxyalkylating agent, characterized in that the reaction is carried out batchwise in a reactor which has an L/D ratio of less than 2.5 and in which the unmixed regions are minimized and the batch reactor is preceded at the inlet by a continuously operated cellulose milling facility and is followed at the outlet by a continuously running plant for milling and drying the products, with the product being transported by action of gravity.

An apparatus for carrying out this process and the methylhydroxyalkylcellulose obtainable by the process are also described.

6 Claims, No Drawings

PROCESS AND APPARATUS FOR THE INDUSTRIAL PREPARATION OF METHYLHYDROXYALKYLCELLULOSE

BACKGROUND OF THE INVENTION

1. Field of the Invention

The present invention relates to a process and an apparatus for the industrial preparation of methylhydroxyalkylcelluloses (hereinafter referred to as MHACs), and more specifically methylhydroxyethylcellulose (MHEC) and methylhydroxypropylcellulose (MHPC).

2. Brief Description of the Prior Art

It is known that MHACs and their specified mixed ethers can be prepared in a multistage process. In the first stage, the cellulose used is gently milled to a desired particle size spectrum. In the second stage, the milled cellulose is intimately mixed with a concentrated aqueous solution of an alkali metal hydroxide, in particular sodium hydroxide, in a mixer, and activated to form the alkali metal cellulose salt. This pretreatment is critical for the properties of the resulting cellulose ethers. The known processes are spray alkalization in a suitable mixing apparatus in which the milled cellulose is sprayed with alkali solution. In the slurry process, the milled cellulose is slurried in a nonsolvent and the alkali is then added. Alkalization in a slurry proceeds more uniformly, and more uniformly substituted products are obtained. In the mash alkalization process, the cellulose is slurried in aqueous sodium hydroxide and subsequently passed through screw presses or sieve drum presses.

In the third stage, the heterogeneous reaction with the halide of the alkyl radical to be added on as etherifying agent, e.g. methyl chloride, and the hydroxyalkylation agents such as ethylene oxide and/or propylene oxide occurs. The reaction is exothermic and proceeds under pressure.

The reaction sequence in the process can be such that partial alkalization, then partial etherification, repeated partial alkalization or etherification, etc., are carried out.

The difficulty is that the alkalization and etherification are, as exothermic reaction stages, associated with considerable liberation of heat and a simultaneous increase in pressure. Furthermore, there is a risk that uncontrolled temperature peaks can lead to degradation of the molecular weight of the cellulose.

Furthermore, to achieve good economics in an industrial production process, it is necessary for the reaction to proceed in a high space-time yield and give a high throughput combined with a uniform substitution pattern, characterized by the average degree of substitution of methyl DS(M) and the average molar degree of substitution of hydroxyalkyl MS(HAC) for methyl and hydroxyalkyl substitution, respectively.

Various properties of the products, e.g. the thermal flocculation point, the solubility, the viscosity, the film formation capability and the adhesive strength, are set via the degree of etherification and the type of substituents.

The further process stages comprise the purification of the cellulose ethers, milling and drying.

The preparation of cellulose ethers, their properties and applications are described in general terms in: Ullmann's Encyclopedia Of Industrial Chemistry, 5th Edition 1986, Volume A5, 461–488, VCH Verlagsgesellschaft, Weinheim, Encyclopedia Of Polymer Science and Engineering, 2nd Edition 1985, Volume 3, 226–269.

It is known from DE-A-2 635 403 that cellulose ethers can be prepared without use of separate reaction vessels for the preparation of the alkali metal cellulose salts or the heterogeneous etherification in a single-stage process. The preparation is done by carrying out the reaction of cellulose to the cellulose ether in a mechanical mixer with fast-running mixing element comprising a ploughshare mixer with choppers in a closed vessel with an adjustable internal pressure and cooling of the interior wall of the vessel. Heat of reaction liberated in the alkalization is substantially absorbed by the vaporization of the alkyl halide and the vaporized alkyl halide is condensed on the cooled wall of the vessel. The mixing vessel described in DE-A-2635403 having a total volume of 20 $m^3$ has a batch time of 4 hours, calculated from filling of the reactor with milled cellulose to the end of the discharge of the methylcellulose having a DS=1.3 at a 75% conversion. For ethylcellulose, this document describes a reactor having a total volume of 25 $m^3$ which allows ethylcellulose having a DS=2.45 to be prepared in 4.5 hours at a conversion of 75%. The maximum achievable capacity is 6000 tonnes per annum at an availability of 8400 h/a.

A further increase in the capacity and thus an improvement in the economics is not possible using the 20 or 25 $m^3$ reactors described in DE-A-2635403. The pressure and temperature rise caused by the exothermic reaction cannot be controlled by the methods described because sufficient rapid mixing, a high mixing effectiveness and sufficient great cooling power cannot be achieved industrially for relatively large reactors by means of the processes described. Thus, the reactor sizes claimed according to the prior art represent an upper limit for reactions which can be controlled safely.

EP-A-023692 describes a process for preparing polysaccharide ethers using a reactor having a multistage agitator and baffles. The universal mixer for different raw materials comprises a stirred vessel with a central vertical mixer shaft with a multistage agitator and baffles. The design is restricted to a shaft mounted at one end, and the torques for mixing of the starting materials and reaction products are consequently limited, thus restricting the capacity.

EP-A-0347653 describes a stirred vessel having radially pumping stirrers and at least one baffle and also a method of mixing liquids with the aid of the stirred vessel. The rapid axial mixing of liquids, even of different densities, is achieved by means of a vertically mounted central stirrer with baffles which are configured as a hydrofoil profile. This arrangement, too, is restricted to the concept of a shaft mounted at one end and thus has a restricted capacity.

EP-A-0470493 describes an upright vessel having a central agitator and baffles for rapid and uniform mixing, even of highly viscous media. A disadvantage thereof is the restricted torque which can be introduced via the shaft mounted at one end, so that the volume of the reaction products to be mixed and homogenized is restricted. This also applies to the apparatus described in SE 940 1144 A for mixing solid/liquid or liquid/liquid substances to produce suspensions, which has a built-in dividing tool transverse to the flow direction which can be operated at different rotational speeds.

U.S. Pat. No. 4,199,266 describes an apparatus for dispersing shear-sensitive solids in a liquid by means of a horizontally installed shaft or an obliquely mounted shaft. Compared with vertical mixers, this gives better mixing of suspensions since heavy particles are lifted. Disadvantages of this arrangement are the restricted torque which can be introduced via the shaft mounted at one end and the limitation of the throughputs.

It is known that, in industrial production processes, an increase in the throughput can be achieved by increasing the volume of the reactor. However, in the preparation of MHAC, the exothermic reaction of the alkalization and etherification makes it necessary to remove the heat via the wall of the reactor, as is described, for example, in DE-A-2 635 403. The reactors of the prior art consequently have a length/cross section ratio of >2.5.

U.S. Pat. No. 4,015,067 describes a continuous process for preparing polysaccharide ethers in which a slurry of finely divided polysaccharide, aqueous alkali metal hydroxide and an etherifying agent are introduced approximately continuously into a tube reactor (with coiled tubes) which is free of obstacles to the flow of the slurry and in which the slurry is conveyed through the reactor during the reaction. The length/cross section ratio (L/D) of the tube reactors is from 5 to 2000, preferably from about 100 to 800. Capacities of more than 6000 tons per annum were able to be achieved by means of this reactor, but the large L/D ratio makes such tube reactors disadvantageous in the case of frequent product changes to different substitution patterns due to product residues in the reactor.

It is therefore an object of the invention to prepare MHACs highly economically in a large amount while at the same time ensuring that the heat of reaction evolved is removed so as to avoid local temperature peaks, the pressure rise can be controlled safely, product deposits are largely avoided on changing product and the products obtained have a uniform substitution pattern with suppression of by-products.

SUMMARY OF THE INVENTION

It has now surprisingly been found that the desired MHAC products can be prepared in high quality and economically according to the invention by stepwise alkalization and etherification using a reactor having an L/D ratio of less than 2.5.

The invention accordingly provides an industrial process for preparing MHACs by reaction of cellulose with alkali metal hydroxide and subsequent reaction with an alkyl halide and hydroxyalkylating agent, wherein the reaction is carried out batchwise in a reactor which has an L/D ratio of less than 2.5 and in which the unmixed regions are minimized and the batch reactor is preceded at the inlet by a continuously operated cellulose milling facility and is followed at the outlet by a continuously running plant for milling and drying the products, with the product being transported by action of gravity.

It has surprisingly been found that only the combination of a continuously operated cellulose milling plant, a batch reactor having an L/D ratio of less than 2.5 and a continuously running plant for milling and drying the products makes possible economical production of the MHACs in a large amount, with the dead volume fraction being minimized. The process is advantageous for production of MHACs with a capacity of more than 6000 tonnes per annum.

DETAILED DESCRIPTION OF THE INVENTION

The invention is described more fully hereunder with particular reference to the preferred embodiments thereof. The reactor preferably contains a mechanical mixer with mixing device and at least one horizontal shaft which is mounted at both ends and is particularly preferably driven at both ends so that it is possible to achieve high torques which lead to rapid and intensive mixing of the starting materials and shortens the diffusion paths and makes accessibility of the anhydroglucose units to the etherification and alkylation reaction uniform. Advantageously, removal of the heat of reaction is ensured, dead volume fractions are minimized and product deposits on changing product are avoided.

The reactor can be equipped with the shafts for the mixing drive in such a way that mutual cleaning of the shafts is possible. In a particular embodiment, the shafts can also be divided so that back mixing of the products can be achieved by means of different directions and speeds of rotation.

To achieve rapid emptying, both the speed of rotation and the direction of rotation can be matched individually to the product produced. Furthermore, complete emptying is ensured by addition of liquids, preferably water. This also fulfils the purpose of flushing the reactor with the aim of ensuring that no product residues remain in the apparatus. Selection and arrangement of suitable spray nozzles ensures that all regions including the mixing tools are uniformly wetted and cleaned.

The reactor is preferably configured so that removal of the heat of reaction occurs by means of intensive cooling of the interior wall and by means of one or more vapour domes distributed symmetrically over the length of the reactor for reflux cooling by condensation of the vapour phase.

The process is usually carried out without solvents at a temperature of up to 150° C., preferably from 90 to 110° C., and a pressure of up to 40 bar, preferably from 20 to 30 bar.

Furthermore, the reactor is preferably configured so that the regions in which no mixing can take place for engineering reasons are as small as possible. The dead volume fraction is, for the purposes of the present invention, the ratio of the volume of unmixed regions $V_U$ to the total volume $V_T$. A minimum possible dead volume fraction for each desired reactor size can be determined by calculation. The calculation is based on the requirements that the mixing tools have to be of a certain minimum distance from the wall and, in addition, there are zones in the region of the installed choppers in which no mechanical movement occurs and no mixing can take place.

It has surprisingly been found that a minimum possible dead volume fraction can be achieved at a volume of greater than 25 m$^3$ by means of a length/diameter ratio (L/D) of less than 2.5, with the result that the unmixed proportion of finished product decreases proportionately to this reduction and the product quality can be improved. It has been found that at an L/D of less than 2.5 the $V_U/V_T$ ratio should be less than 0.007, e.g. in the range from 0.007 to 0.004.

In a particularly preferred embodiment having an L/D of 2.35, MHAC products of high quality are achieved by dead volume fractions being minimized and the reactor being equipped with choppers arranged on the interior walls and having a cylindrical geometry and the inlet and outlet valves being arranged so that complete filling and emptying occurs and the geometry of the shafts being such that caked product is scraped off at the end faces of the reactor.

As an alternative to the procedure described, it has been found that continuous operation of the milling and drying plant can advantageously be maintained by means of two buffer vessels downstream of the reactor, characterized in that the vessels are alternately filled and likewise alternately emptied so that a continuous product flow is ensured.

Furthermore, in the case of plants having a capacity of greater than 6000 tons per annum it has been found that a continuous product stream for supplying the milling and drying unit is made possible by installation of two reactors which are operated alternately. This makes separate buffer vessels dispensable.

The invention further provides an apparatus for carrying out the process described and provides for the use of this apparatus for carrying out this process.

Particularly fibre-free products which can be dissolved to give a clear solution are obtained in increased yield according to the invention. The invention therefore further provides MHACs which are obtainable by the process of the invention and dissolved to give clear solutions having a relative turbidity of less than 10 NTU. The turbidity is measured by means of a Laboratory Turbidimeter Model 2100AN, Hach Company, Loveland, Colo., U.S.A. For the present purposes, NTU (Nephelometric Turbidity Units) is a relative scattering signal. The greater the value of this relative scattering signal NTU, the more turbid the solution and thus the poorer the clarity of the solution of the product concerned.

EXAMPLES

1. Example (L/D<2.5)

A reaction mixer having a ratio of L/D=1.5 and provided with ploughshares as mixing elements is charged with 67.92 kg of milled cellulose (Ethenier F). The reactor is subsequently evacuated and then brought to atmospheric pressure by means of nitrogen. 150.4 kg of a 50% strength aqueous sodium hydroxide solution are then added. After the alkalization, 41.76 kg of propylene oxide are added and 218.9 kg of a chloromethane/dimethyl ether mixture having a chloromethane content of 52.6% are subsequently introduced.

After the reaction is complete and the reaction product has been purified, a methylhydroxypropylcellulose having an average degree of substitution of methyl of $DS_{methyl}=1.88$ and a molar degree of substitution $MS_{propoxyl}=0.21$ is obtained. Measurement of the turbidity on a 2% strength solution using the Laboratory Turbidimeter Model 2100AN, Hach Company, Loveland, Colo., U.S.A., gives a value of 6.14 NTU. This value is significantly lower and thus better than that for methylhydroxypropylcellulose prepared in Example 2 using a reactor having an L/D of greater than 2.5.

2. Example (L/D>2.5) Comparative Example

A reaction mixer having a ratio of L/D=2.6 and provided with ploughshares as mixing elements is charged with 990 kg of milled cellulose (Ethenier F). The reactor is subsequently evacuated and then brought to atmospheric pressure by means of nitrogen. 1505 kg of a 50% strength aqueous sodium hydroxide solution are then added. After the alkalization, 300 kg of propylene oxide are added and 1861 kg of a chloromethane/dimethyl ether mixture having a chloromethane content of 47% are subsequently introduced.

After the reaction is complete and the reaction product has been purified, a methylhydroxypropylcellulose having an average degree of substitution of methyl of $DS_{methyl}=1.98$ and a molar degree of substitution $MS_{propoxyl}=0.28$ is obtained. Measurement of the turbidity on a 2% strength solution using an instrument for measuring the relative turbidity gives a value of 15.3 NTU. This value is significantly worse than in the case of the methylhydroxypropylcellulose which was prepared in Example 1 in a reactor having an L/D of 1.5. The product from this comparative example has a higher fibre content than that from Example 1 according to the invention and thus has a poorer solution clarity.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for the industrial preparation of methylhydroxyalkylcelluloses (MHACs) by reaction of cellulose with alkali metal hydroxide and subsequent reaction with an alkyl halide and hydroxyalkylating agent, comprising carrying out the reaction batchwise in a reactor which has an L/D ratio of less than 2.5 and in which the unmixed regions are minimized and the batch reactor is preceded at the inlet by a continuously operated cellulose milling facility and is followed at the outlet by a continuously running plant for milling and drying the products, with the product being transported by action of gravity.

2. The process according to claim 1, wherein the reactor has a mechanical mixer with mixing device having at least one horizontal shaft which is mounted at both ends.

3. The process according to claim 2, wherein the shaft is driven at both ends.

4. The process according to claim 2 wherein the reactor has two separate shafts which are located directly opposite one another and can be operated independently at different rotational speeds, directions of rotation and geometries.

5. The process according to claim 1 wherein the reactor has a cylindrical geometry; inlet and outlet valves arranged to effect complete filling and emptying; shaft geometry effective to have caked product is scraped off at the end faces of the reactor and the number and arrangement of choppers matched to the geometry of the shaft-equipped mixer.

6. The process according to claim 1 wherein the minimum dead volume fraction $V_U/V_T$ is <0.007.

* * * * *